US006954886B2

(12) United States Patent
Tu et al.

(10) Patent No.: US 6,954,886 B2
(45) Date of Patent: Oct. 11, 2005

(54) DETERMINISTIC HARDWARE RESET FOR FRC MACHINE

(75) Inventors: Steven J. Tu, Phoenix, AZ (US); Hang T. Nguyen, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 355 days.

(21) Appl. No.: 10/039,638

(22) Filed: Dec. 31, 2001

(65) Prior Publication Data

US 2003/0126531 A1 Jul. 3, 2003

(51) Int. Cl.[7] ............................................. G01R 31/28
(52) U.S. Cl. ...................................... 714/726; 714/733
(58) Field of Search ................................ 714/726, 727, 714/10, 11, 23; 713/1

(56) References Cited

U.S. PATENT DOCUMENTS

| 3,701,972 | A | | 10/1972 | Berkeley et al. | |
|---|---|---|---|---|---|
| 4,325,120 | A | * | 4/1982 | Colley et al. | 711/202 |
| 5,155,856 | A | * | 10/1992 | Bock et al. | 713/1 |
| 5,163,155 | A | * | 11/1992 | Omiya | 714/726 |
| 5,260,950 | A | * | 11/1993 | Simpson et al. | 714/727 |
| 5,758,058 | A | * | 5/1998 | Milburn | 714/11 |
| 5,862,373 | A | | 1/1999 | Pathikonda et al. | |
| 5,935,266 | A | * | 8/1999 | Thurnhofer et al. | 714/726 |
| 6,061,599 | A | | 5/2000 | Rhodehamel et al. | |
| 6,114,887 | A | | 9/2000 | Pathikonda et al. | |
| 6,125,463 | A | * | 9/2000 | Macchi | 714/726 |
| 6,357,024 | B1 | | 3/2002 | Dutton et al. | |
| 6,393,582 | B1 | * | 5/2002 | Klecka et al. | 714/11 |
| 6,615,366 | B1 | | 9/2003 | Grochowski et al. | |
| 6,625,749 | B1 | | 9/2003 | Quach | |
| 6,625,756 | B1 | | 9/2003 | Grochowski et al. | |
| 6,640,313 | B1 | | 10/2003 | Quach | |
| 6,708,304 | B1 | * | 3/2004 | Tsukimori et al. | 714/726 |

OTHER PUBLICATIONS

Joel M. Tendler, Steve Dodson, Steve Fields, Hung Le, Balaram Sinharoy, IBM Server Group, IBM eserver, POWER4 System Microarchitecture, Technical White Paper, Oct. 2001, pp. 1–33.
David J.C. Johnson, Fort Collins Microprocessor Lab, HP's Mako Processor, Oct. 16, 2001, 16 pgs.
Sun Microelectronics, MicroSPARC–IIep™, Introduction to JTAG Boundary Scan, White Paper Jan. 1997 (10 pgs).

* cited by examiner

*Primary Examiner*—Albert Decady
*Assistant Examiner*—John P. Trimmings
(74) *Attorney, Agent, or Firm*—Blakely, Sokoloff, Taylor and Zafman (57) ABSTRACT

A processor includes one or more execution cores, each execution core having an associated scan chain to provide data to a set of voltage nodes of the core. A reset module drives a data pattern onto the scan line, responsive to a reset event. The data pattern places the set of voltage nodes of each execution core into specified logic states. For a processor including multiple execution cores configured to operate in an FRC mode, identical data patterns are driven onto the scan chains to reduce indeterminacy in the reset machine state of the processor.

37 Claims, 6 Drawing Sheets

DETERMINISTIC HARDWARE RESET FOR FRC MACHINE

BACKGROUND OF THE INVENTION

1. Technical Field

The present invention relates to microprocessors and, in particular, to mechanisms for resetting the machine states of processors.

2. Background Art

Reset refers to the mechanism by which a computer system is put into a reference state. A computer system may be reset when it is first turned on, or an operating computer system may be reset in response to events, such as the occurrence of certain error conditions. At reset, the central processing unit (CPU or processor) of the computer system is typically put into a particular machine state. For a computer system that does not support functional redundancy checking (FRC), this state may be defined "loosely". For example, a reset pin may force a relatively small fraction of the processor nodes, e.g. latches, flip flops and the like, to specified logic states, with the states of the remaining nodes left indeterminate. For such non-FRC systems, the indeterminate states of the unspecified nodes have no impact on the visible results produced by the processor at its output pins. Such processors may be more difficult to debug, but the problem is still relatively manageable.

For processors that implement FRC, the reset state can have a significant impact on debug, verification and operation. One mechanism for implementing FRC replicates the instruction execution cores of a processor, runs the same instruction code on each processor core and compares results from the different cores at one or more stages of execution. If a discrepancy is detected, the computer system enters an error-handling mode, which may require reset of one or both pipelines. Current processing technologies allow the replicated cores to be implemented on a single processor die (multi-core processors).

The points of comparison between results from the different execution cores form the FRC boundary. The FRC boundary typically includes many more signals than appear on the processor's input/output (I/O) pins to provide reliable checking. The machine states of a processor that implements FRC are thus examined at a significantly finer level of detail than those of a non-FRC processor. Indeterminate states in the nodes of one or the other execution core can lead to unnecessary mismatches at the FRC boundary.

One strategy for addressing this problem is to run a reset code module in response to a reset event. The reset code steps the processor through a precise sequence of operations that force targeted processor nodes to specified logic states. More nodes may be driven to specified states by using ever larger and more complex reset codes, but developing, debugging and validating such reset codes is very costly.

The present invention address these and other problems associated with generating deterministic reset states for processors.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The machine state of a processor is determined by the states of its nodes. These nodes include the voltages on latches, flip-flops and like components of various storage and control logic of the processor. A reset mechanism places a processor in a known machine state before the processor is allowed to begin executing code freely. This specified starting point ensures that the processor's output is reliable and reproducible.

A non-FRC processor may operate reliably by driving a relatively small number of its many nodes to specified states. The unspecified nodes do not affect the results generated by the processor once it begins operating after reset. The nodes that are required to be in specified states may be handled through a hardware reset tree and a relatively modest reset code. The reset code may be stored in firmware accessible to the processor on reset.

Figure 1:
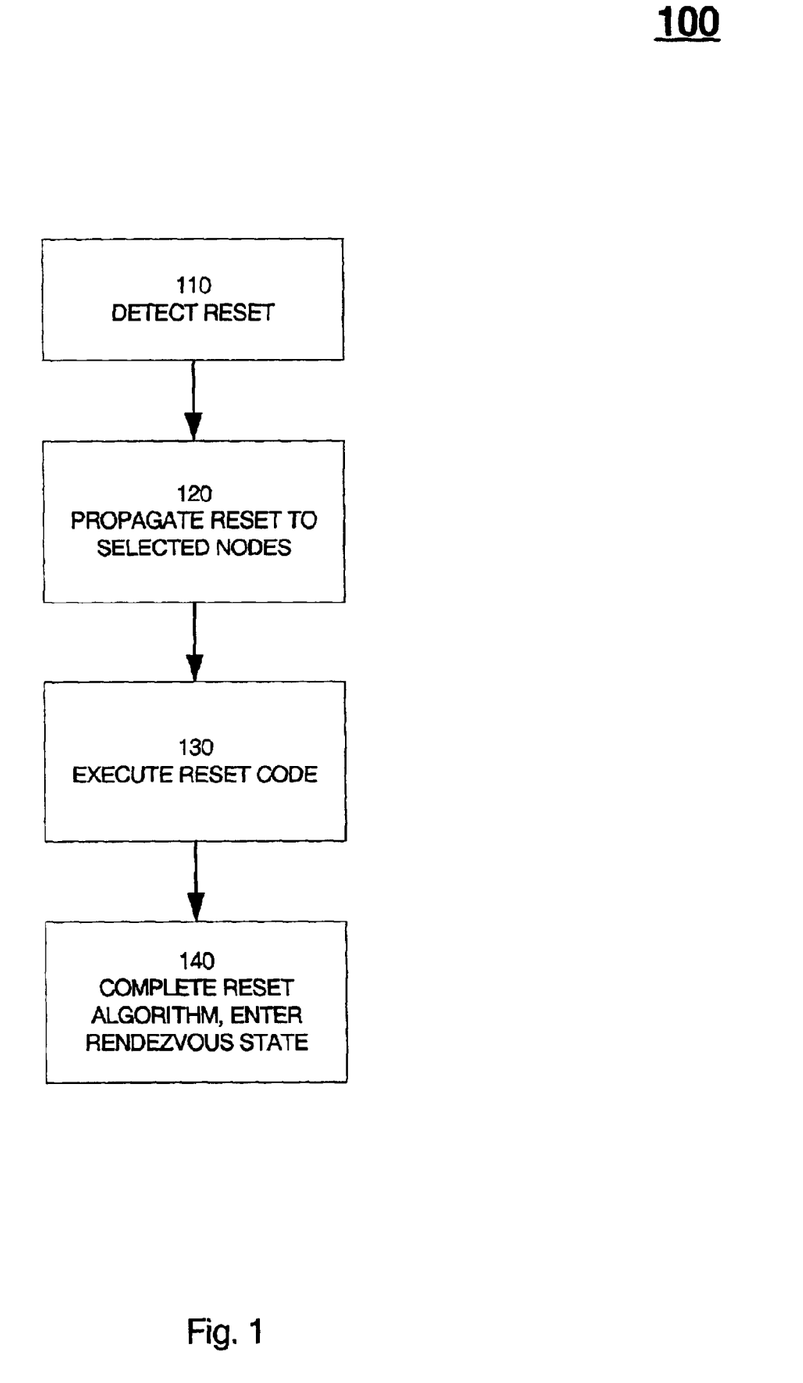
FIG. 1 is a flowchart providing a high level view of a reset operation typical of a non-FRC processor.

FIG. 1 is a flowchart representing a reset operation for a non-FRC processor. A reset signal is detected 110 by, for example, asserting a voltage level on a processor pin (reset pin). The reset signal is propagated 120 down a reset tree to drive various nodes of the processor to specified states. Propagation of the reset signal typically reaches only a small fraction of the nodes of a processor. Even for a non-FRC processor, the number of nodes reached through a reset tree is generally not sufficient to ensure that the processor provides reliable results when it begins operations. For these processors, control transfers 130 to an entry point for reset code indicated by a RESET vector. The processor executes 140 the reset code to drive additional nodes to specified states. Some processors may employ resettable latches at all or most nodes that require specification on reset, which reduces or eliminates the reset code required.

As noted above, the minimum reset state necessary to provide reliable, reproducible results for a processor that implements FRC is significantly larger than that necessary for a non-FRC processor. The present invention provides a flexible mechanism for establishing a reset state in an FRC processor.

Figure 2:
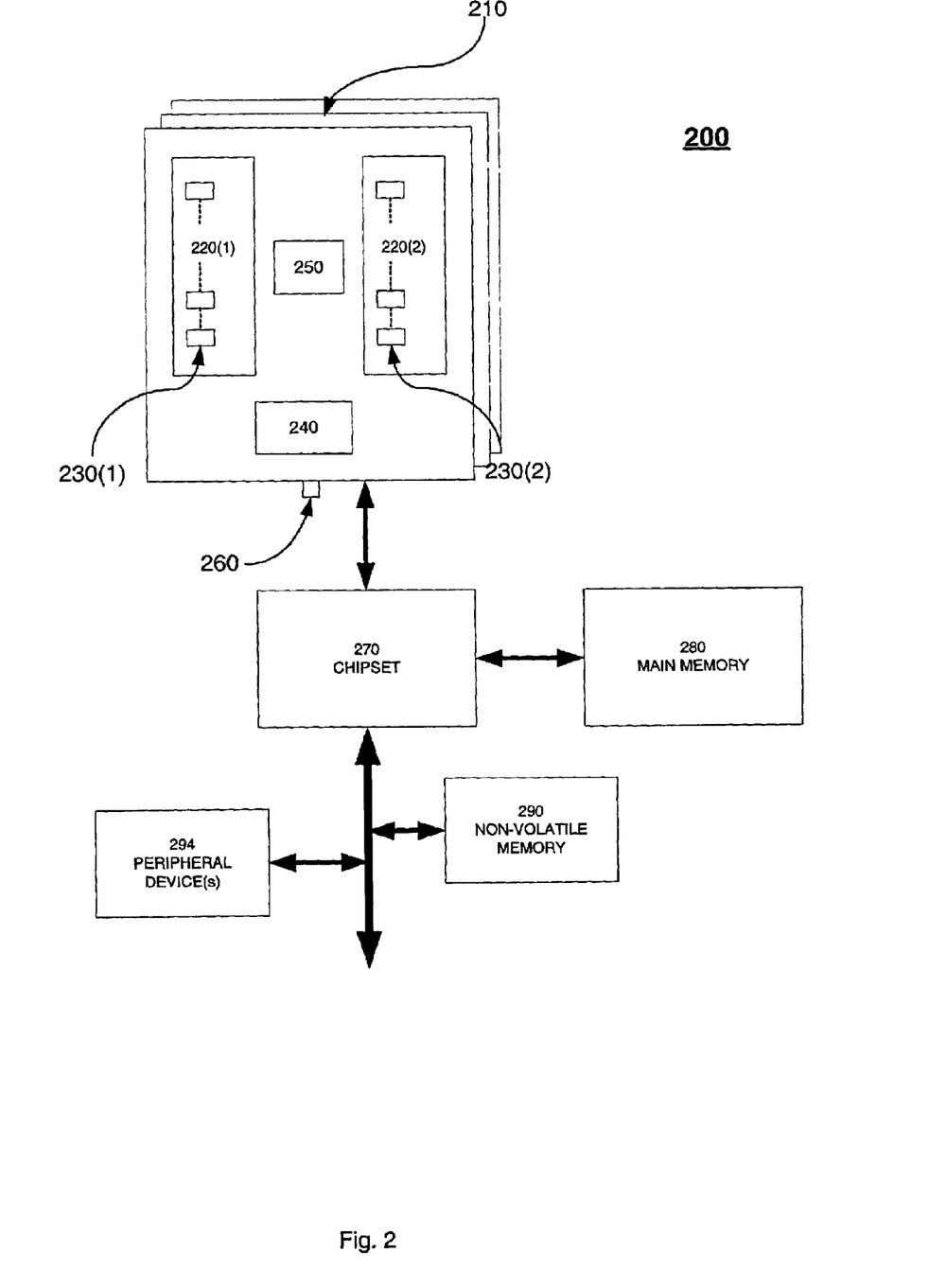
FIG. 2 is a block diagram of one embodiment of a computer system suitable for implementing the present invention.

FIG. 2 is a block diagram of one embodiment of a computer system 200 in which the present invention may be implemented. Computer system 200 includes one or more multi-core processors 210, a chipset or system logic 270, main memory 280, a non-volatile memory 290, one or more peripheral devices 294. Chipset 270 controls data transfers among processor(s) 210, main memory 280, non-volatile memory 290, and peripheral devices 294. Computer system 200 is provided to illustrate various features of the present invention. The particular configuration shown is not necessary to implement the present invention.

The disclosed embodiment of processor 210 includes first and second execution cores 220(1) and 220(2), respectively, a reset module 240, an FRC checker 250, and a test access port (TAP) 260. Each execution core 220 includes one or more scan chains 230 that may be accessed through a port 260. For one embodiment of system 200, port 260 may be a test access port (TAP) as specified by IEEE standard 1149.1 and its revisions. FRC checker 250 represents the FRC boundary for the disclosed embodiment of processor 210. As indicated in the figure, the FRC boundary is internal to the die on which processor 210 is formed, where it can receive signals reflecting the state of data from execution cores 220.

Reset module 240 controls scan chains 230 in response to a reset signal. As discussed below in greater detail, reset module 240 uses scan chains 230 to force various nodes of execution cores 220 that are accessible through scan chains 230 into specified states. Reset module 240 is shown as a single unit for convenience. Embodiments of system 200 may include a reset module 240 for each execution core 220 or for different subsets of execution cores 220 if processor 210 includes more than two execution cores 220.

Figure 3:
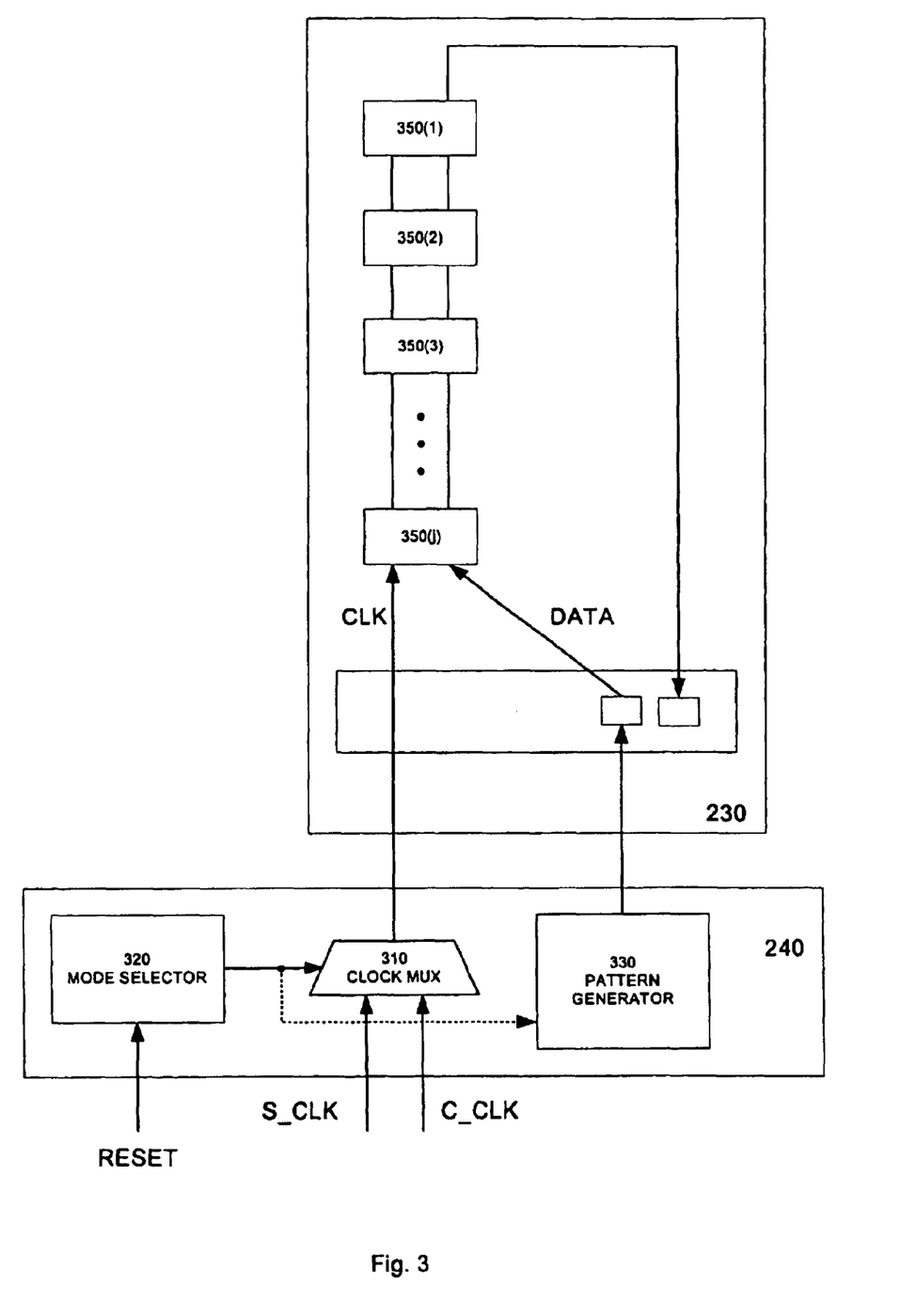
FIG. 3 is a block diagram representing one embodiment of the reset module shown in FIG. 2.

FIG. 3 shows in greater detail one embodiment of reset module 240 and scan chain 230. Scan chain 230 includes processor nodes 350(1)–350(j) (generically, nodes 350) that are connected in series through a data line DATA and a clock line CLK. Processor nodes 350 represent latches, flip-flops, and comparable devices for storing data and signals that accompany instructions in process by execution core 220. Generally, the nodes included in a scan chain are selected from the execution, staging and control logic of processor 210 to provide control points that may be programmed and monitored for testing/debugging a processor. For example, a node or sequence of nodes may specify a state or data register for the processor.

For the present invention, scan chain 230 may include additional nodes 350 selected to provide a more deterministic reset state for processor 210. During testing/debug, scan chain 230 allows data and/or instructions to be loaded into selected nodes 350. Processor 210 is then stepped through execution cycles and values in various nodes 350 may be captured for analysis. A typical scan chain may include thousands of such nodes and an execution core may have multiple scan chains. During RESET, scan chain 230 provides an additional function. Embodiments of processor 210 may include scan chains 230 that are used exclusively for debug/validation, exclusively for reset or for both debug/validation and reset.

The disclosed embodiment of reset module 240 includes a clock mux 310, a clock mode selector 320 and a RESET pattern generator 330. Clock mode selector 320 detects a reset condition and provides a signal to a control input of clock mux 310. Clock mux 310 provides a clock signal to the clock line (CLK) of scan chain 230, responsive to the signal from selector 320. For example, if processor 210 is in its normal operating mode, clock inputs (C) of processor nodes 350 are driven by a core clock signal (C_CLK). If a reset condition is triggered, nodes 350 are driven by a scan clock signal (S_CLK). Generally, S_CLK will have a lower frequency than C_CLK due to the physical limitations of scan chain circuitry. For the disclosed embodiment of reset module 240, mode selector 320 triggers clock mux 320 to provide S_CLK to nodes 350 in response to a reset signal, and C_CLK to nodes 350 if no reset signal is detected.

Reset pattern generator 330 provides a bit pattern to the data line (DATA) of scan chain 230, using S_CLK. The bit pattern is driven to nodes 350 of scan chain 230 to put them in a deterministic state. For example, reset pattern generator 330 may output a string of 1's, a string of 0's or a string including some pattern of 1's and 0's, e.g. 101010101 . . . For many nodes, the exact values driven matter less than the fact that as a result of reset module 240, each node 350 on scan chain 230 will be in a defined state. By applying the same bit pattern to both execution cores 220 of processor 210, the reset states of corresponding nodes 350 are identical. This reduces the potential for discrepancies between the reset machine states of execution cores 220, making their combined behavior more predictable. The likelihood of FRC checker 250 detecting a result mismatch attributable to differences in the reset machine states of execution cores 220 is greatly reduced. The more extensively scan chain 230 cover nodes 350 of processor 210, the less opportunity there is for such discrepancies to arise.

Figure 4A:
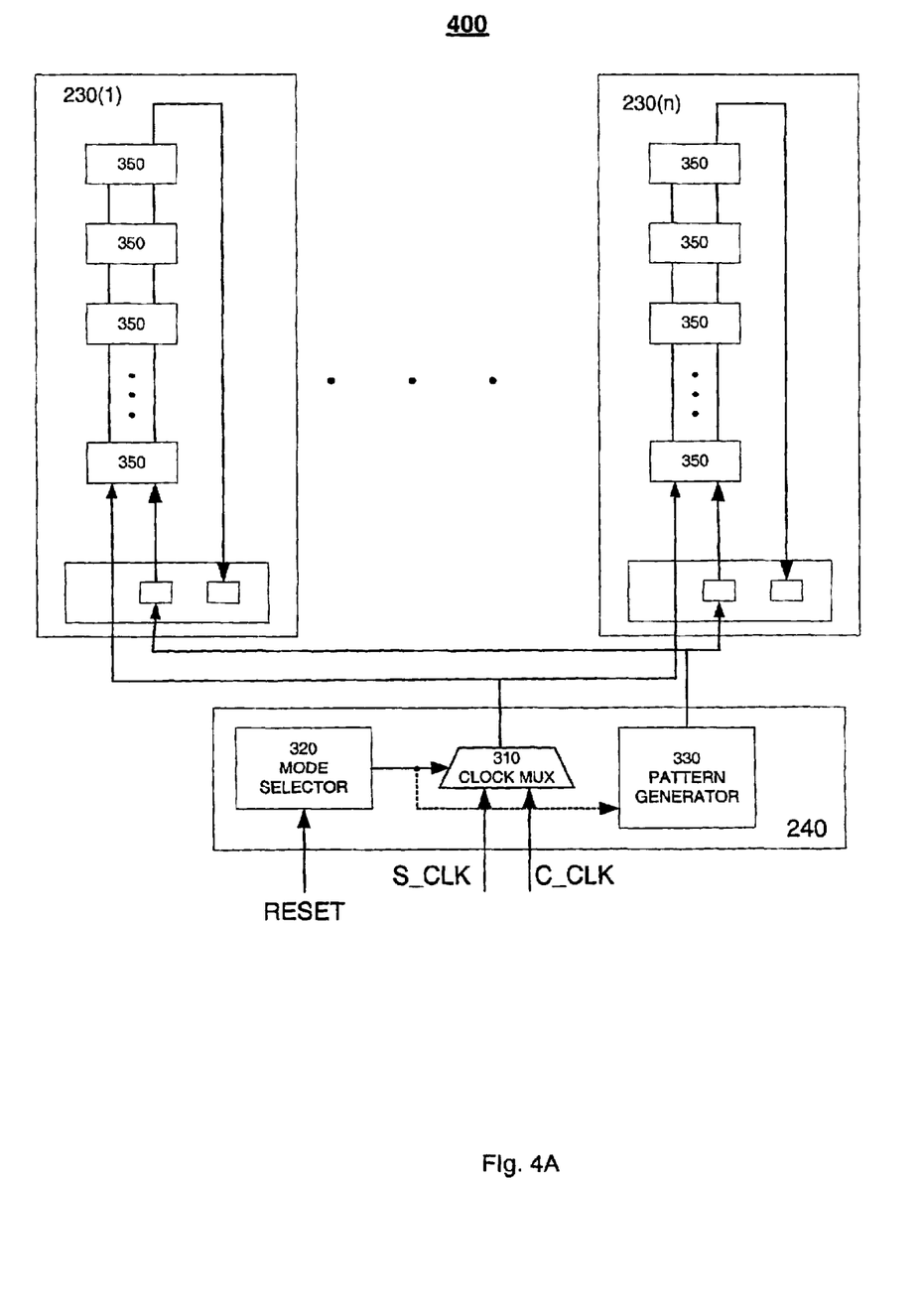
FIGS. 4A and 4B are block diagrams showing embodiments of a reset module driving multiple scan chains in parallel and serial configurations, respectively.

FIG. 4A is a block diagram representing a reset system 400 in which reset module 240 drives a parallel configuration of scan chains 230(1)–230(n). Reset system 400 allows nodes 350 of scan chains 230(1)–230(n) to be placed in their reset states in parallel. For example, for dual core processor 210, n=2, and corresponding nodes 350 in scan chains 230(1), 230(2) of execution cores 220(1), 220(2), respectively, may be driven to their reset states in parallel. Of course, separate reset modules 240 may be used for each execution core 220 and the same result will result provided pattern generators 330 are properly matched.

Figure 4B:
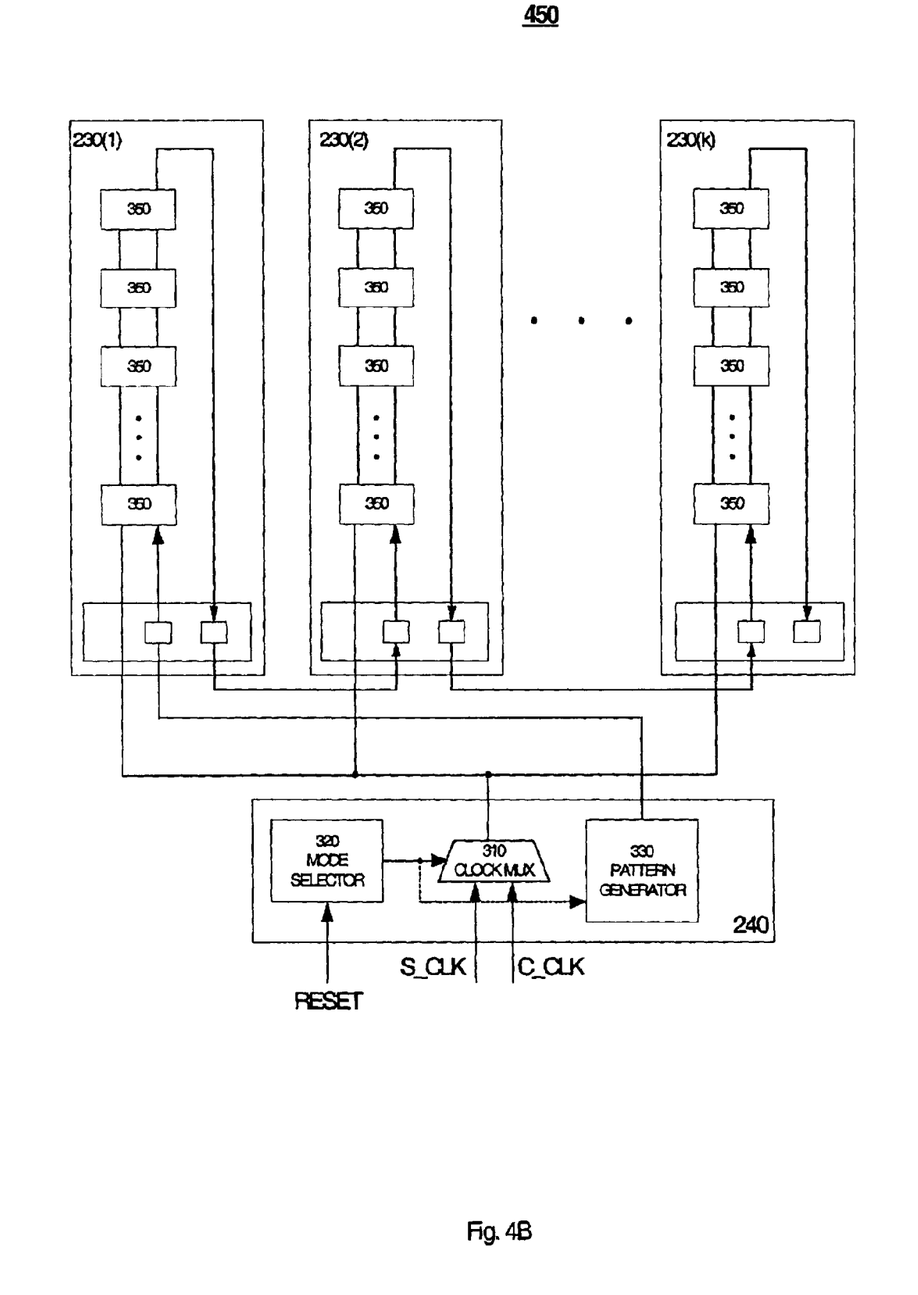

FIG. 4B is a block diagram representing a reset system 450 in which reset module 240 drives a series configuration of scan chains 230(1)–230(k). The disclosed configuration may be useful, for example, within a given execution core 220, since each execution core 220 may have multiple scan chains 230.

Hybrids of systems 400 and 450 may also be implemented, in which reset module 240 drives scan chains 230 in various combinations of parallel and serial configurations. For example, reset module 240 may drive corresponding scan chains 230 of each execution core 220 in parallel, while driving different scan chains 230 within each execution core in series. That is the first scan chain in execution cores 220(1)–120(n) may be driven in parallel, followed by the second scan chains in execution cores 220(1)–120(n) et seq.

Figure 5:
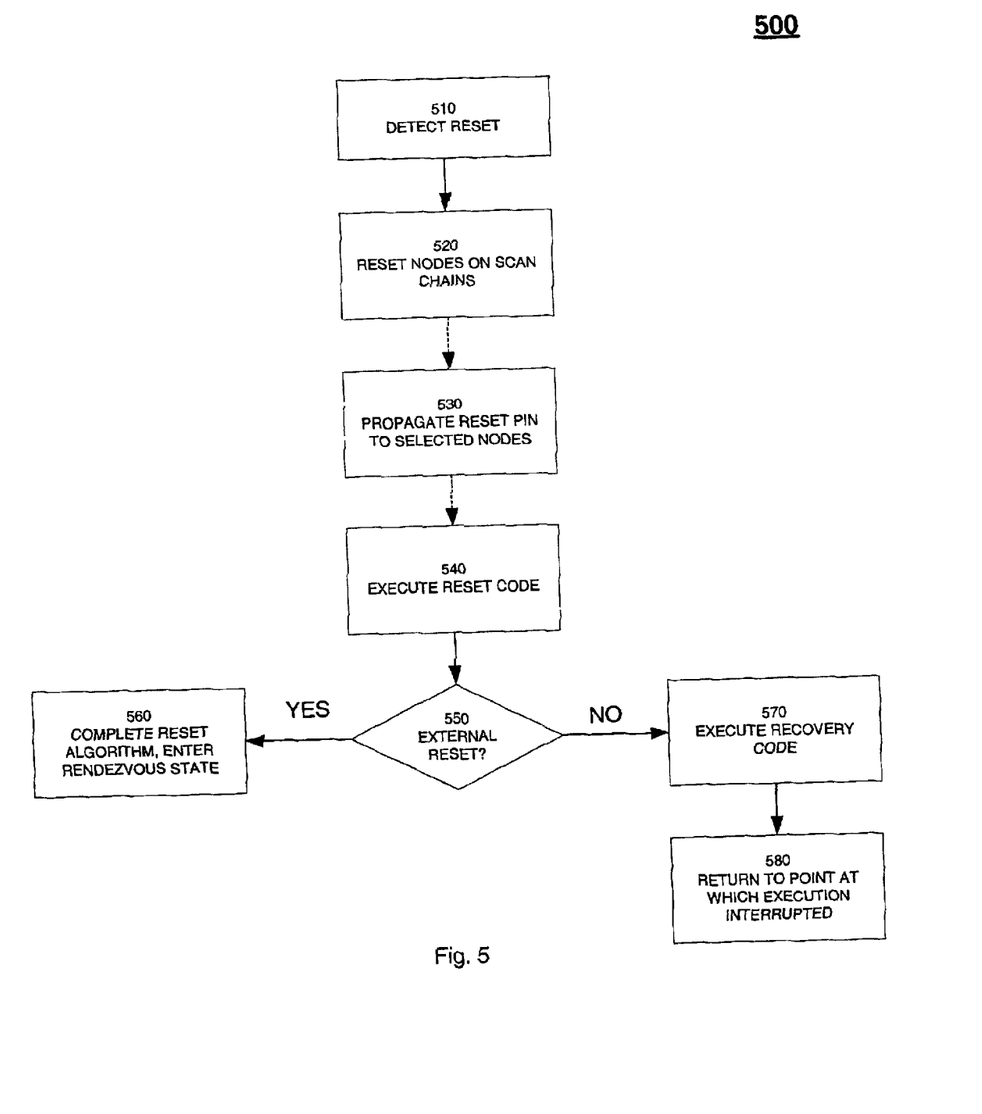
FIG. 5 is a flowchart representing on embodiment of a method in accordance with the present invention for establishing the reset state of a processor.

FIG. 5 is a flow chart representing one embodiment of a method 500 for resetting the execution cores of a multi-core processor. A reset signal, triggered by, for example, a cold start (cold reset) or an FRC mismatch (warm reset) is detected 510. Responsive to the reset signal, nodes on scan chains of each execution core are driven 520 to specified states. For example, a reset module applies a scan clock to the nodes of the scan chain and an associated pattern generator drives a bit pattern onto the nodes. For an FRC processor, the same bit pattern drives corresponding scan chains in each execution core. Typically, a reset signal is propagated 530 to any nodes on a hardware reset tree to drive them to specified states. Further, reset code, if present, is executed 540 to drive additional nodes to their reset states.

For one embodiment of method 500, the source of the reset event is checked 550. If the reset event is an "external reset" such as a cold reset or other platform generated reset, a reset algorithm may be executed and a rendezvous state entered 560. The reset algorithm may include, for example, tests of the processor, system components, and the like. If the reset is an internal reset, e.g., in response to an FRC mismatch, method 500 may execute a correction routine 570 to address the source of the mismatch and return 580 to execution at the point at which it was interrupted.

For one embodiment of computer system 200, processor(s) 210 may be configured in a high reliability mode or a high performance mode. The mode may be selected when system 200 is booted. Some embodiments of system 200 may be able to convert between modes on the fly, e.g. after boot. For the high reliability mode, FRC checker 250 is activated and execution cores 220 operate on identical code streams to implement FRC. For the high performance mode, FRC checker 250 is deactivated, and execution cores 220 operate on different code streams, effectively doubling the throughput of processor 210. For this embodiment of computer system 200, reset mechanism 100 may be implemented on reset if the processor is in high performance mode, and reset mechanism 500 may be implemented on reset if the processor is in high reliability, i.e. FRC, mode.

There has thus been provided a mechanism for establishing the reset state of a processor, using scan chains. In response to a reset event, a reset module drives specified bit patterns onto the scan chains to set the states of the component nodes (latches, flip-flops, and the like). For multiple execution cores in FRC mode, identical patterns on driven onto corresponding scan chains in each execution core. The resulting reduction in unspecified nodes provides greater control over the reset machine state of the processor. For an FRC processor, this translates to a lower likelihood of FRC mismatches attributable to indeterminate node states.

The disclosed embodiments have been provided to illustrate various features of the present invention. Persons skilled in the art of processor design, having the benefit of this disclosure, will recognize variations and modifications of the disclosed embodiments, which none the less fall within the spirit and scope of the appended claims.

We claim:

1. An apparatus comprising:
    a functional redundancy checking (FRC) processor including:
    first and second execution cores to operate in FRC mode;
    first and second scan chain corresponding to the first and second execution cores to transfer data to one or more nodes of the first and second execution cores; and
    a reset module including a pattern generator to store and provide an identical bit pattern to the first and second scan chains, responsive to a reset signal.

2. The apparatus of claim 1, wherein the rest module drives the first and second scan chains in parallel.

3. The apparatus of claim 1, wherein the reset module further comprises:
    a clock mux to provide a first or second clock signal to the scan chain, responsive to a reset signal.

4. The apparatus of claim 3, wherein the reset module further comprises a mode selector to assert a signal to the clock mux and the pattern generator, responsive to assertion of the reset signal.

5. The apparatus of claim 1, further comprising a reset tree to propagate voltage states to selected nodes of the execution core, responsive to the reset signal.

6. The apparatus of claim 1, further comprising a storage device to store a reset code module, the reset code module to step the execution core through a sequence of operations to establish states for additional nodes of the execution core.

7. A method for resetting a multicore FRC processor comprising:
    detecting a reset event;
    generating a bit pattern in a reset module of the multicore FRC processor;
    applying the bit pattern to a corresponding scan chain in each of the execution cores of the processor, the bit pattern to drive specific states to one or more processor nodes accessible through the scan chains.

8. The method of claim 7, wherein applying the bit pattern comprises:
    applying a scan clock to a clock line of the scan chain; and
    applying the bit pattern to a data line of the scan chain.

9. The method of claim 7, further comprising propagating the reset signal to selected nodes of the processor through a reset tree.

10. The method of claim 9, further comprising executing a reset code module to place additional nodes of the processor into specified states.

11. The method of claim 9, wherein applying the bit pattern to a corresponding scan chain in each execution core comprises applying the bit pattern in parallel to the corresponding scan chains.

12. The method of claim 7, further comprising detecting an operating mode for the processor.

13. The method of claim 12, wherein detecting the operating mode comprises determining if the operating mode is a high performance mode or a high reliability mode, and applying a bit pattern to the scan chain comprises applying a bit pattern to the scan chain if the determined mode is the high reliability mode.

14. A system comprising:
    a processor including:
        first and second execution cores to be operated an FRC mode, responsive to a mode bit, each of the execution cores including a scan chain to transfer data to a first set of nodes of the execution core;
        an FRC checker to be activated in FRC mode to compare data from the first and second execution cores; and
        a reset module to apply a bit pattern to the scan chains of the first and second execution cores, responsive to a reset event in the system.

15. The system of claim 14, wherein the reset module includes pattern generator to drive the bit pattern on data lines of the scan chains of the first and second execution cores responsive to a scan clock.

16. The system of claim 15, further comprising a reset tree, the reset tree including electrical connections to a second set of nodes to drive the second set of nodes to specified states responsive to the reset event.

17. The system of claim 16, further comprising a storage device to store a reset code module, the reset code module to be executed by the first and second execution cores to drive a third set of nodes to specified states, responsive to the reset event.

18. The system of claim 17, wherein the first, second, and third sets of nodes are mutually exclusive.

19. An apparatus comprising:
    a FRC processor including,
        a first and second execution core to operate in FRC mode, each having a first set of voltage nodes coupled through data and clock lines; and
        a reset module, including a pattern generator to drive a data signal and a clock signal to the first sets of voltage nodes, responsive to occurrence of a reset event, the data signal to place the voltage nodes of the first sets in specified logic states.

20. The apparatus of claim 19, wherein the data signal driven by the reset module is a bit pattern that places the first set of voltage nodes of the first and second execution cores in the specified logic states.

21. The apparatus of claim 20, wherein the reset module drives the first set of voltage nodes of the first and second execution cores in parallel.

22. The apparatus of claim 19, wherein the first an second execution cores to be operated in an FRC mode, responsive to a mode bit being in a first state.

23. The apparatus of claim 22, wherein the reset module is disabled and the execution cores are operated in a non-FRC mode, responsive to the mode bit being in a second state.

24. The apparatus of claim 19, further comprising a reset tree to drive a second set of voltage nodes of the apparatus to second logic states, responsive to occurrence of the reset event.

25. The apparatus of claim 24, further comprising a storage device to store a reset code module, the reset code module to be executed by the execution cores to place a third set of voltage nodes in each of the execution cores in specified logic states, responsive to the reset event.

26. The apparatus of claim 25, wherein the reset module establishes specified logic states for the first set sets of voltage nodes before the reset code module is executed.

27. A multicore processor comprising:
a first and second execution core to operate in a functional redundancy checking (FRC) mode;
a first and second scan chains corresponding to the first and second execution cores to transfer data to one or more nodes of the first and second execution cores;
a FRC boundary checker to compare nodes of the first and second execution cores; and
an internal reset module, including a pattern generator to store bit pattern, to provide the bit pattern to the first and second scan chains to put the first and second execution cores into a deterministic state responsive to a reset signal generated upon detection of a mismatch by the FRC boundary checker.

28. The apparatus of claim 27, wherein the reset module drives the first and second scan chains in parallel.

29. The apparatus of claim 27, wherein the reset module further comprises:
a clock mux to provide a first or second clock signal to the scan chains responsive to a reset signal.

30. The apparatus of claim 29, wherein the reset module further comprises a mode selector to assert a signal to the clock mux and the pattern generator, responsive to assertion of the reset signal.

31. The apparatus of claim 27, further comprising a storage device to store a reset code module, the reset code module to step the execution cores through a sequence of operations to establish states for additional nodes of the execution cores.

32. The apparatus of claim 27, further comprising a reset tree to propagate voltage states to selected nodes of the execution cores, responsive to the reset signal.

33. A method for resetting a functional redundancy checking (FRC processor comprising:
performing a deterministic hardware reset in the FRC processor, the performing including,
performing functional redundancy boundary checking;
generating a reset event upon a functional redundancy boundary checking mismatch;
generating a bit pattern responsive to the reset event; and
driving the bit pattern into scan chains.

34. The method of claim 33 wherein the processor includes multiple execution cores to operate in FRC mode and wherein the driving the bit pattern comprises applying the bit pattern to a corresponding scan chain in each of the execution cores.

35. The method of claim 34, wherein the applying the bit pattern to a corresponding scan chain in each execution core comprises applying the bit pattern in parallel to the corresponding scan chains.

36. The method of claim 33, further comprising the preliminary operation of:
detecting the FRC processor is in a high reliability mode, wherein the processor can operated in the high reliability mode or a high performance mode.

37. The method of claim 33, wherein the performing further comprises propagating deterministic states through a reset tree to other processor nodes.

* * * * *

UNITED STATES PATENT AND TRADEMARK OFFICE
CERTIFICATE OF CORRECTION

PATENT NO. : 6,954,886 B2
DATED : October 11, 2005
INVENTOR(S) : Tu et al.

It is certified that error appears in the above-identified patent and that said Letters Patent is hereby corrected as shown below:

Column 6,
Line 10, delete "specific" and insert -- specified --.
Line 36, after "operated", insert -- in --.
Line 47, after "includes", insert -- a --.

Column 7,
Line 11, delete "an" and insert -- and --.

Column 8,
Line 18, delete "(FRC" and insert -- (FRC) --.

Signed and Sealed this

Third Day of January, 2006

JON W. DUDAS
*Director of the United States Patent and Trademark Office*